UNITED STATES PATENT OFFICE.

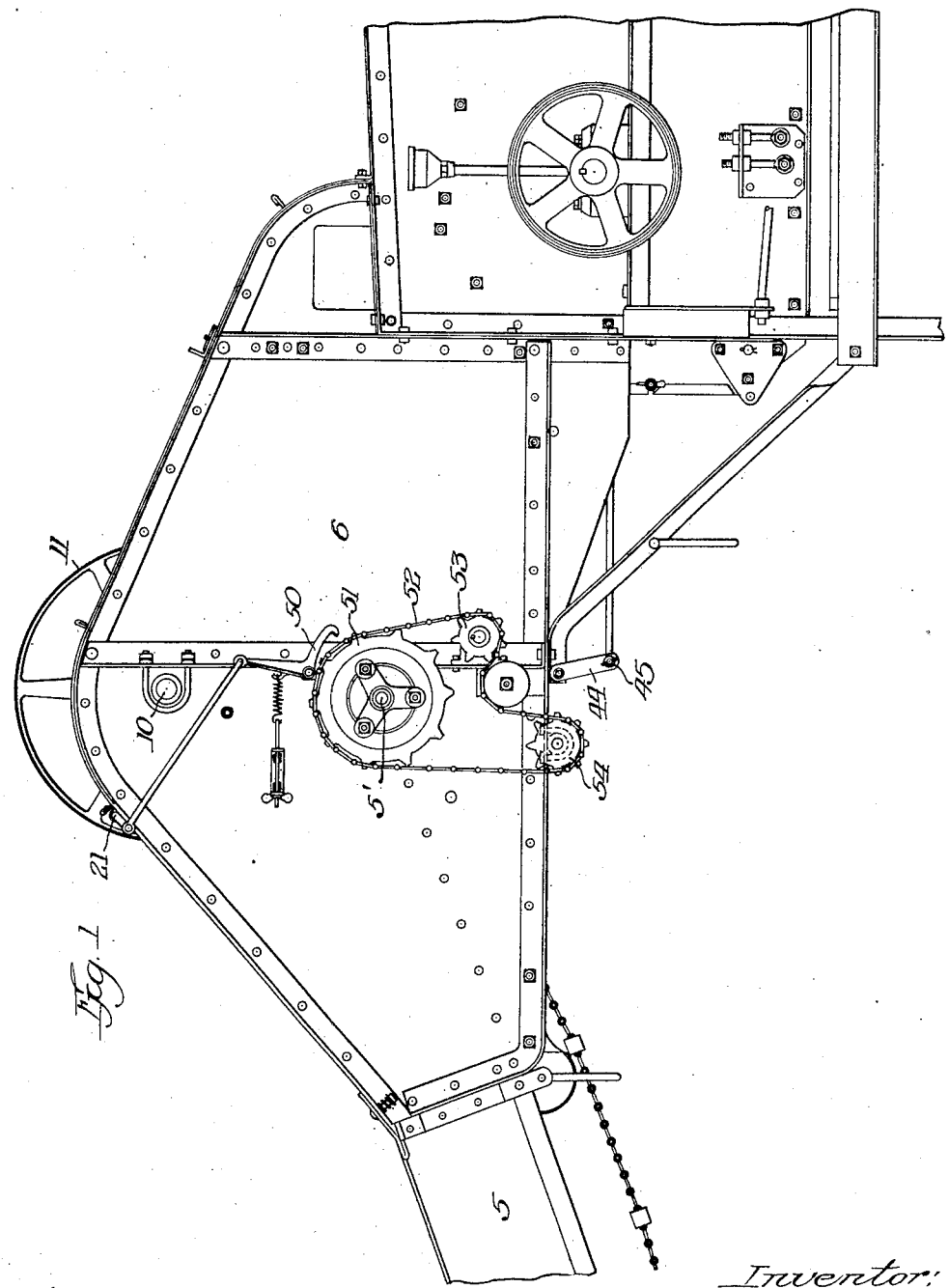

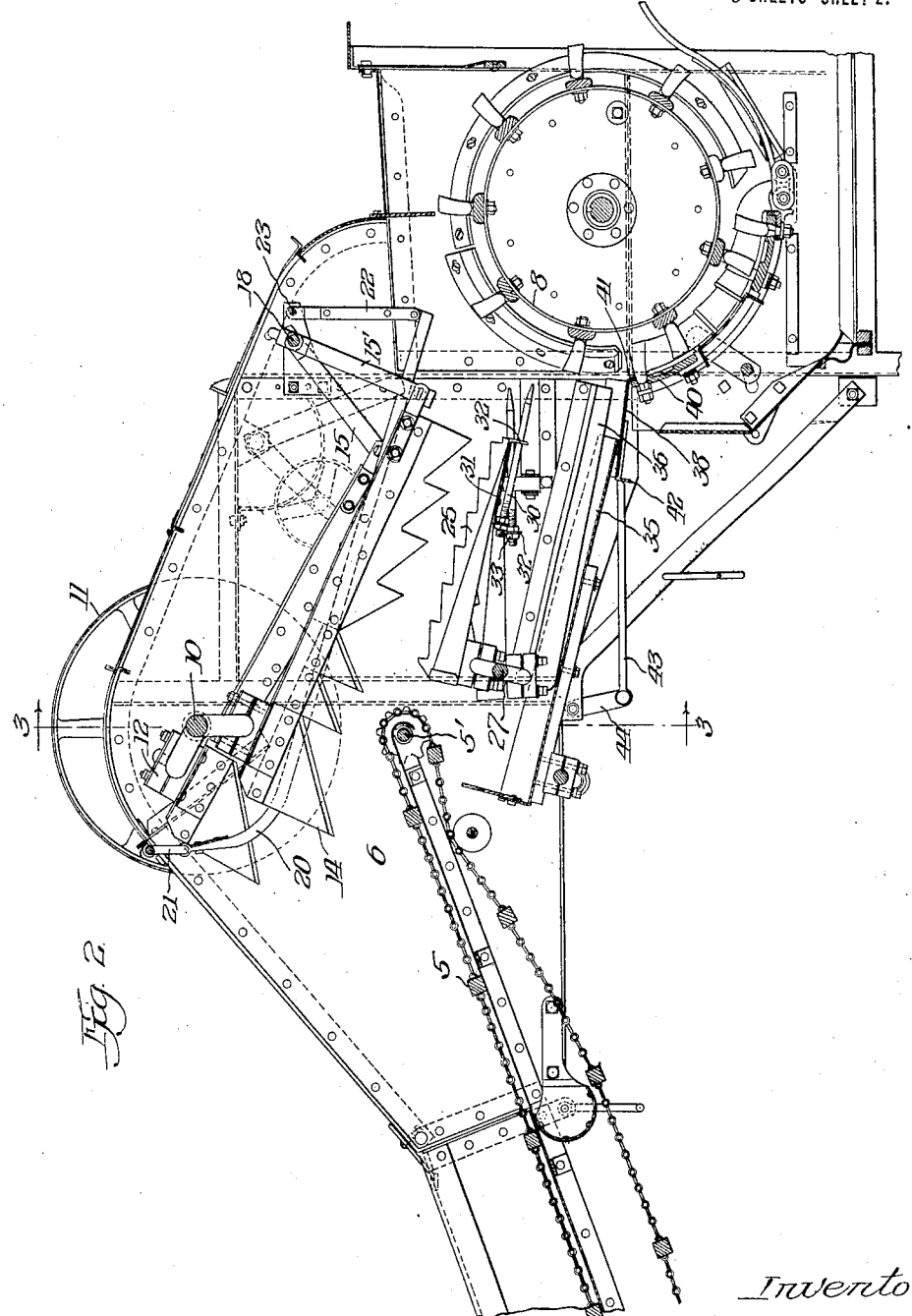

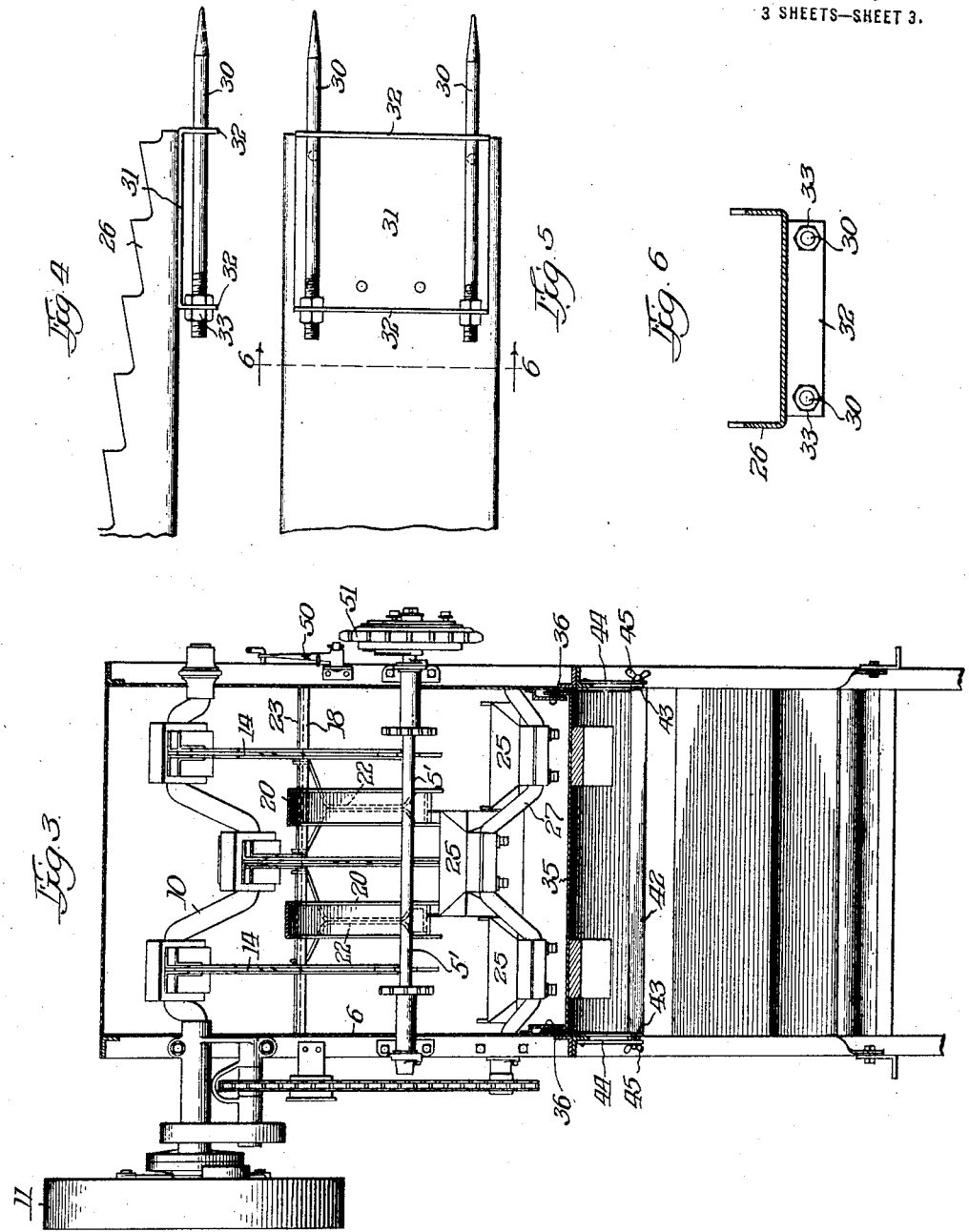

NORMAN R. KRAUSE, OF RACINE, WISCONSIN, ASSIGNOR TO J. I. CASE THRESHING MACHINE COMPANY, OF RACINE, WISCONSIN, A CORPORATION.

SELF-FEEDER FOR THRASHING MACHINES.

1,412,559. Specification of Letters Patent. Patented Apr. 11, 1922.

Application filed June 21, 1920. Serial No. 390,523.

*To all whom it may concern:*

Be it known that I, NORMAN R. KRAUSE, a citizen of the United States, residing at Racine, in the county of Racine and State of Wisconsin, have invented certain new and useful Improvements in Self-Feeders for Thrashing Machines, of which the following is a specification.

My invention relates to that character of self-feeders for thrashing machines disclosed in United States Letters Patent No. 1,325,691, issued December 23, 1919, and consists in certain details of construction and arrangements of parts whereby I have produced such a feeder more simple in arrangement and operation, and particularly adaptable for use in connection with small sized thrashers of limited capacity.

In the accompanying drawings, forming part hereof, Figure 1 is a side elevation of a feeder embodying my invention; Fig. 2 a longitudinal sectional view thereof; Fig. 3 a transverse vertical sectional view taken on the dotted line 3, 3 in Fig. 2; Fig. 4 a side elevation, Fig. 5 an underside plan, and Fig. 6 a transverse sectional view taken on the dotted lines 6, 6, in Figs. 4 and 5, of one of the feed-pans which I employ and showing the arrangement and attachment of retarding fingers associated therewith.

In said drawings, the portions marked, 5, indicate the conveyer, which may be of any appropriate construction for the purpose of carrying straw to the feeder, the latter being enclosed within walls, as 6, and cooperating with an adjacent thrashing cylinder, 8, as is common.

In the forward end of the feeder I mount a crank-shaft, 10, adapted to be driven by a governor pulley, 11, from any suitable source of power. In bearings, 12, connected with said crank-shaft 10 are mounted a series of cutter-bars, 14, of any suitable construction, which extend rearwardly to and are attached to hangers, 15, which in turn are pivotally suspended from a shaft, 18, extending transversely of the feeder. As indicated in Fig. 3, I have shown three of such cutter-bars, and at each side of the middle bar thereof I mount straw governor shoes, 20, upon a crank-shaft, 21, which shoes are positioned between the bars 14 and extend rearwardly and are pivotally secured to the rear ends of supporting members, 22, secured to a shaft, 23. Beneath said cutter-bars 14 I arrange a complement of feed-pans, 25, one for each such cutter-bar, which may be of any suitable construction and preferably provided with serrated walls, 26. Said feed-pans are mounted upon a crank-shaft, 27, by which they are reciprocated to cooperate with cutter-bars 14 for propelling material to cylinder 8, as is common. Upon the bottom of each of said feed-pans 25 I secure retarding fingers, 30, preferably one at each side of the pan, by mounting them in retainers, 31, provided with flanges, as 32, through which the fingers are inserted and held in position by adjusting nuts, 33, by which they may be permitted to be extended or retracted at will in relation to cylinder 8 according to existing thrashing conditions. Beneath said feed-pans 25 I place a delivery pan, 35, at each side of which is a deflector, 36, for deflecting falling material into said pan. The rear end of said delivery pan 35 is slidably mounted upon a feed-plate, 38, which rests upon the concave, 40, having a lip, 41, which overlaps said concave, its opposite end being flanged, as at 42. As it is desirable at times to remove said feed-plate for access to the concave and cylinder, I secure the same in position by a movable rod, 43, which is mounted upon the link, 44, and adjustably held in position by a wing nut, 45.

In operation, as will be understood, the rotary elements are connected by a suitable belt system communicating with the shaft of cylinder 8. Straw bundles are delivered by the conveyer 5 to the cutter-bars 14 where the bands are cut and the bundles disrupted by the reciprocatory action of said cutter-bars, and propelled rearwardly therebetween and the feed-pans 25, the combined action of both sets of said reciprocating mechanisms forcing the material over retarding fingers 30 to cylinder 8, said fingers cooperating with said cutter-bars and feed-pans to retard the material and to evenly regulate its flow to the cylinder 8, so that the latter will not become overloaded, and slugging therefore avoided. During such operation it frequently occurs through a slowing down of the mechanism or over-feeding by the attendants. that the straw becomes bunched or irregular in its mass and in quantities which the cutter-bars and feed-pans cannot efficiently manipulate, in which circumstance the material spreads beyond the influence of such cutter-bars and will become choked if no preventive means is provided. This situation, however, I guard against by providing the yieldingly mounted shoes 20, which, when pressed by such surplus material, will be raised, which movement actuates crank-shaft 21 to operate a trip, 50, to check the rotary motion of a straw governor, as 51, mounted upon the conveyer shaft 5', at which instant the conveyer 5 is immovably held in position, so that the cutter-bars 14 and feed-pans 25 will continue to operate through the action of governor pulley 11, acting upon the excess material to propel it rearwardly, and, as it becomes cleared, the shoes 20 and crank-shaft 21 return to normal position, which action causes trip 50 to release straw governor 51, when it resumes operation and actuates conveyer 5 to continue its delivery of material to the cutter-bars, and to operate the feed-pans which communicate therewith through suitable driving mechanism, as the link-belt, 52, and sprockets, 53, 54, shown in Fig. 1, or otherwise.

I am aware that yielding shoes of a limited length have been employed in connection with cutter-bars, but in the use of shoes extending from the front end of the cutter-bars and back and rearwardly over the cylinder I am enabled to govern the straw volume at any point inside the feeder. In the event any excess material should be forced beyond the rear end of the cutter-bars and the cylinder momentarily fails to withdraw it the straw governing shoe or shoes will become lifted and actuated by such excess material so that it obtains more than normal clearance within which to spread and thus in condition to be operated upon by the cylinder, under which condition the feeder is prevented from choking. In this manner the volume of straw and grain entering the cylinder is readily controlled. It will thus be seen that the shoes have an extensive range of operation, which is not true of such shoes in common use because, being of limited length and influence on the material, they govern the material only at the front portion of the feeder, and therefore, have but limited usefulness, while my improved shoe not only acts for the purpose stated but also performs the service of a floating cutter-bar in its cooperation with those devices.

When it is considered that a self-feeder for thrashing machines is usually of a complex character, and is required to perform the heavy work of handling many tons of material daily, under many varying conditions, it will be seen that I have provided an extremely simple device for the purpose, embodying comparatively few parts, and one which I have demonstrated in actual practice is highly efficient for its purpose.

I claim as my invention:

In combination, a cylinder, cutter-bars and feed-pans cooperating therewith for feeding material thereinto, governing shoes yieldingly mounted in advance of and between said cutter-bars and positioned therebetween and terminating at the rear ends thereof in proximity to and over said cylinder, pivotally mounted hangers supporting the rear ends of said shoes and positioned in proximity to and above said cylinder, and means for actuating said cutter-bars.

In testimony whereof I affix my signature in the presence of two witnesses.

NORMAN R. KRAUSE.

Witnesses:
    E. M. JOHNSON,
    J. A. WALSH.